Figure 1:
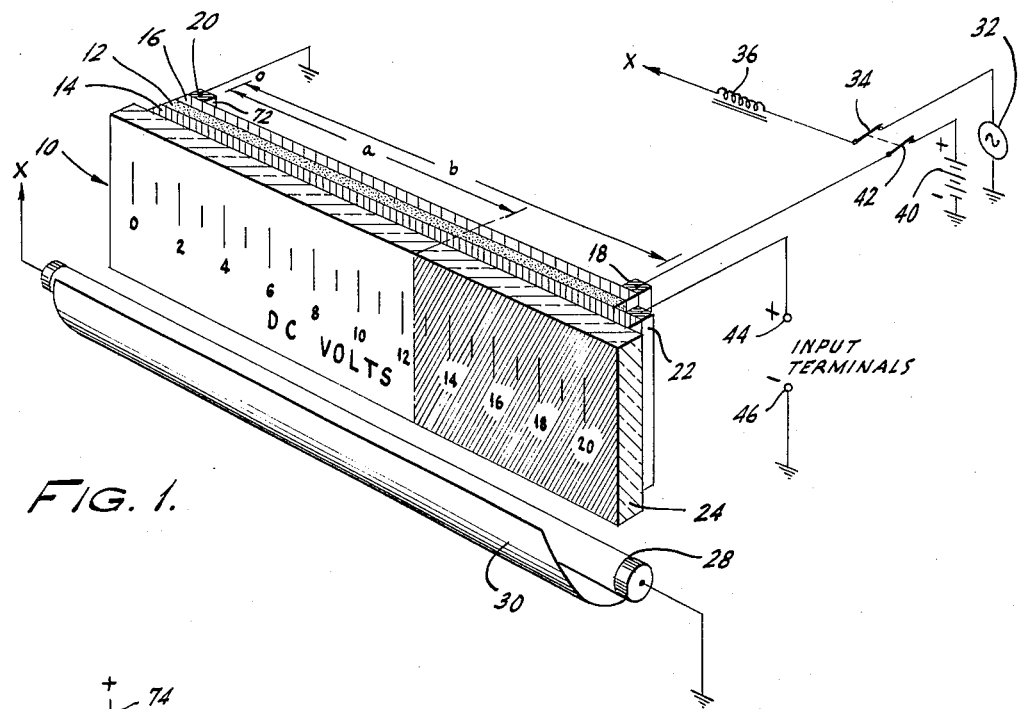

April 5, 1966   L. W. HERSHINGER   3,244,979
VOLTAGE-INDICATING APPARATUS EMPLOYING ELECTROQUENCHABLE
PHOSPHOR LAYER
Filed March 21, 1961

INVENTOR.
LINCOLN W. HERSHINGER
BY
Herbert Epstein
AGENT 3,244,979
VOLTAGE-INDICATING APPARATUS EMPLOYING ELECTROQUENCHABLE PHOSPHOR LAYER
Lincoln W. Hershinger, Oreland, Pa., assignor, by mesne assignments, to Philco Corporation, Philadelphia, Pa., a corporation of Delaware
Filed Mar. 21, 1961, Ser. No. 97,298
10 Claims. (Cl. 324—96)

This invention relates to a novel voltage-indicating apparatus which, because it has no moving parts, possesses advantages over ordinary voltmeters. For example the assembly may be mounted in any orientation without impairing its accuracy. Its accuracy is not affected by shocks and jars which would seriously damage the movement of an ordinary moving-coil voltmeter. As will appear more fully hereinafter, the apparatus may take a variety of forms to enable it to be fitted into a complex instrument panel in a form best suited for that panel. By contrast the form of an ordinary moving-coil voltmeter is severely limited by the structure of the movement.

Accordingly an object of the invention is to provide novel voltage-indicating apparatus having no moving parts.

Another object is to provide voltage-indicating apparatus which can be mounted in any orientation without affecting its accuracy, is insensitive to shock, and can be made in a variety of forms.

A layer composed of either of the phosphors cadmium sulfide and zinc cadmium sulfide is responsive to ultraviolet radiation incident thereon to emit visible light. The intensity of light emitted by any region of such a phosphor layer can be reduced, i.e. the phosphor can be quenched, by applying a reverse-biasing potential (a potential negative with respect to that of said region) to a rectifying connection positioned over said region. Although the invention is not limited by any theory, the following is believed to be the explanation for this quenching. The aforementioned phosphors are n-type semiconductors which are excitable by ultraviolet radiation to produce hole-electron pairs and emit visible light when these hole-electron pairs recombine. However application of a reverse-biasing potential to a rectifying connection positioned over a region of the phosphor layer establishes an electric field within said region which attracts many of the holes generated by the ultraviolet radiation toward the rectifying connection, repels an equivalent number of electrons in said region away from the rectifying connection, and thus separates the holes and electrons in said region. This separation reduces markedly the number of recombinations of holes and electrons within said region and therefore reduces markedly the intensity of visible light emitted thereby in response to ultraviolet irradiation.

The voltage-indicating apparatus of the invention comprises a layer of such an electroquenchable phosphor and conductive layers applied to opposing surfaces thereof in at least partial juxtaposition. One of these conductive layers is translucent to exciting radiation, e.g. ultraviolet light, one is translucent to visible light emitted by the phosphor layer and one provides a rectifying connection to the phosphor layer. To excite the phosphor layer to emit visible light, means (e.g. an ultraviolet-emissive lamp) are provided for supplying radiant energy to the phosphor layer by way of the conductive layer translucent thereto. In addition, means are provided for establishing a potential gradient along one conductive layer and for applying a potential to be measured to the other conductive layer. If this potential is intermediate the minimum and maximum potentials applied to the opposing conductive layer, one region of the area rectifying connection provided by one or each conductive layer will be reverse-biased, and concurrently another region thereof will be forward-biased. The position of the boundary between the reverse-biased and forward-biased regions—i.e. the position at which opposing portions of the two conductive layers are at the same potential—is determined by the magnitude of the applied potential to be measured. The reverse-biasing potential quenches only the portion of the phosphor layer lying beneath the reverse-biased portion of the rectifying connection.

Accordingly the position of the boundary between the luminous and quenched areas of the phosphor layer indicates the magnitude of the applied potential. In those embodiments in which only one of the two conductive layers provides a rectifying connection to the phosphor layer, the display produced by the apparatus in response to an applied potential of increasing value is a widening area of light. In those embodiments in which both conductive layers provide rectifying connections to the phosphor layer, the display produced in response to an applied potential of increasing value is a narrow band of light moving across the phosphor layer to successive positions corresponding to a substantially zero potential difference between opposing regions of the two conductive layers. To make the device into a direct-reading voltmeter, an appropriately calibrated scale inscribed on translucent material may be positioned over one of the conductive layers which is transmissive of visible light.

Figure 2:
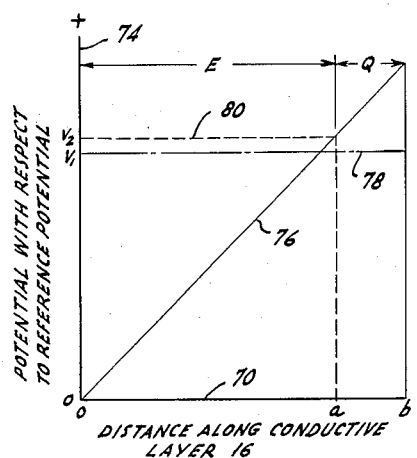

The invention will be described in greater detail with reference to the appended drawings forming part of the specification in which:

FIGURE 1 is a diagram of a voltage-indicating apparatus according to the invention, and FIGURE 2 is a graph used in describing the operation of the system of FIGURE 1.

FIGURE 1 shows a voltage-indicating apparatus 10 comprising a rectangular phosphor layer 12, a rectangular conductive layer 14 applied to one surface of phosphor layer 12 and providing a rectifying connection thereto, and a rectangular conductive layer 16 applied to the opposite surface of phosphor layer 12. A pair of conductive terminal strips 18 and 20 respectively are affixed to layer 16 along opposing edges thereof, and a terminal strip 22 is affixed to layer 14.

All of these layers, the respective thicknesses of which are greatly exaggerated for clarity, are applied to a supporting faceplate 24 composed of an insulating material translucent to both the exciting radiation and the light emitted by phosphor layer 12 in response thereto.

Phosphor layer 12 is composed of an electroquenchable phosphor excitable by ultraviolet light, for example zinc cadmium sulfide. Conductive layer 14 is composed of a mixed oxide of tin and indium. This film is translucent to both ultraviolet and visible light and has an electrical resistance per unit area which is low compared to that of phosphor layer 12, e.g. only one-tenth of the resistance per unit area of layer 12. Conductive layer 16 is composed of an opaque metal, e.g. aluminum, which makes an essentially ohmic electrical connection with phosphor layer 12. Its resistance is discussed hereinafter. Faceplate 24 is composed of an electrically insulating substance transmissive of both the exciting radiation and the visible light emitted by phosphor layer 12 in response to this excitation, and has an appropriate scale applied to a surface thereof. Pyrex glass is a suitable material for faceplate 24. A method for fabricating assembly 10 is described hereinafter.

To excite phosphor layer 12, a source 28 of ultraviolet radiation is provided. In the form shown, source 28 comprises a tubular ultraviolet-emissive lamp of conventional structure. The ultraviolet radiation of lamp 28 is directed onto faceplate 24 by a reflector 30 and is transmitted to phosphor layer 12 by faceplate 24 and conductive layer 14. Lamp 28 is energized by an alternating voltage supplied by a source 32 via a switch 34 and current limiting reactor 36.

To establish a potential gradient along conductive layer 16, a constant unidirectional voltage supplied by a source 40 is applied between terminal strips 18 and 20. The positive pole of source 40 is connected to terminal strip 18 by way of a switch 42 ganged to switch 34, and terminal strip 20 and the negative pole of source 40 are both connected to a point at reference potential.

Conductive layer 16 has a resistance much higher than the internal resistance of source 40, e.g. 10 times higher. However the resistance per unit area of layer 16 is much lower than that of phosphor layer 12, e.g. only one-tenth as high. Because layer 16 has a high resistance compared to source 40, most of the voltage supplied by source 40 appears between terminal strips 18 and 20 and develops the requisite potential gradient along layer 16. Because layer 16 has a low resistance per unit area compared to phosphor layer 12, the latter does not short-circuit layer 16 to conductive layer 14. Preferably the resistance of layer 16 also is sufficiently high that it draws a relatively small current from source 40. However this resistance should be low enough to supply the amount of current needed to quench phosphor layer 16.

The system also comprises input terminals 44 and 46 between which the voltage to be measured is applied. Terminal 44 is directly connected to conductive layer 14 by way of terminal strip 22, and terminal 46 is directly connected to a point at reference potential.

The operation of the system of FIGURE 1 is now described with reference to FIGURE 2. The axis of abscissas 70 of FIGURE 2 represents distance along conductive layer 16 measured from the surface 72 of terminal strip 20. The axis of ordinates 74 represents electrical potential with respect to reference potential. The solid line 76 represents the potential distribution along conductive layer 16. The broken line 78 represents the potential $V_1$ to be measured, which is applied to conductive layer 14 via terminals 44, 46 and terminal strip 22. The dashed line 80 represents a potential $V_2$ which when applied to a region of conductive layer 16 is just sufficiently more positive than the potential $V_1$ applied to conductive layer 14 to quench completely the portion of phosphor layer 12 underlying said region.

In operating the system of FIGURE 1, switches 34 and 42 are closed to energize lamp 28 and connect source 40 between terminals 18 and 20. Lamp 28 floods the entire surface of phosphor layer 12 adjoining conductive layer 14 with ultraviolet radiation. The constant unidirectional potential supplied by source 40 establishes a potential gradient along conductive layer 16. So long as terminals 44 and 46 are open-circuited, the entire irradiated surface of phosphor layer 12 emits visible light because no portion of the area rectifying connection provided by conductive layer 14 is reverse-biased and hence no quenching occurs.

The unidirectional voltage $V_1$ to be measured is applied between terminals 44 and 46 in the polarity indicated in FIGURE 1. As shown in FIGURE 2, the potential of conductive layer 16 has a value equal to or greater than $V_2$ only in the area thereof bounded by a and b. Hence only the portion of the area rectifying connection (provided by layer 14) which lies between a and b (region Q) is reverse-biased by voltages sufficiently high to quench completely the portion of phosphor layer 12 underlying it. This quenched region is indicated by cross-hatching on faceplate 24. By contrast the portion of phosphor layer 12 extending from O to a (region E) emits light in response to ultraviolet excitation. The position of the boundary a between the light-emissive region of phosphor layer 12 and its completely quenched region depends on the value of the voltage applied between terminals 44, 46. When this voltage is decreased to values less than $V_1$, the boundary a moves to the left, and when this voltage is increased to values greater than $V_1$, the boundary a moves to the right. The voltages corresponding to various positions of boundary a are indicated by the scale inscribed on translucent faceplate 24. The assembly can be recalibrated readily by applying a voltage of known value between terminals 44, 46 and adjusting source 40 to supply a voltage such that assembly 10 correctly indicates the value of the applied voltage The following process has been found suitable for fabricating assembly 10. One surface of faceplate 24 is degreased by employing any one of a number of conventional techniques—e.g., by cleansing the surface with a chromic acid solution and rinsing it with distilled water. Then faceplate 24 is placed into the evacuatable chamber of a metal evaporation apparatus and the chamber is evacuated to a pressure of about 0.1 micron of mercury or less. Next enough oxygen is admitted into the chamber to raise the gas pressure therewithin to about one micron of mercury. Then a tablet composed of about 75 percent by weight of indium and about 25 percent by weight of tin is heated to a temperature of between about 700° C. and 800° C. in a molybdenum boat positioned within the chamber. Typically this tablet is a cylinder 70 mils in diameter and 35 mils thick. Heating vaporizes tin and indium from the tablet. The vaporized metals condense on the cleansed surface of faceplate 24 which is positioned at a suitable distance from the molybdenum boat. For example, where the longer sides of faceplate 24 are about four inches long, a suitable distance between the boat and the cleansed surface of faceplate 24 is about six inches. Because oxygen is present in the chamber, part of the vaporized tin and indium is oxidized in travelling between the boat and faceplate 24. This oxide also condenses on the surface of faceplate 24. The evaporation is continued until the entire tin-indium tablet has evaporated.

Next faceplate 24 is removed from the evaporation chamber and placed in a furnace at room temperature. The furnace is flushed with oxygen and evacuated to a pressure of about 500 microns of mercury. Then the furnace is heated to about 400° C. and is maintained at this temperature for between about 1 and 15 minutes. As a result of this heating in the presence of oxygen, the tin and indium in the film are oxidized completely to a mixed tin-indium oxide which is translucent both to visible light and ultraviolet radiation. Typically the film has a thickness of the order of 0.1 micron and constitutes conductive layer 14.

Then the phosphor layer 12 is deposited onto conductive layer 14 in the following manner. Faceplate 24 is placed in an evaporation chamber which is then evacuated to a pressure of less than 0.05 micron of mercury. Next cadmium sulfide is evaporated onto conductive film 14 from a molybdenum boat heated to a temperature of about 800° C. The evaporation is continued for about one hour and deposits a cadmium sulfide layer about one micron thick on conductive film 14. Then the cadmium sulfide layer is converted into a luminescent zinc cadmium sulfide layer by heating the cadmium sulfide film in a furnace in the presence of zinc chloride. Prior to the heating, the furnace is flushed with oxygen and evacuated to a pressure of about 5 millimeters of mercury. Then the cadmium sulfide film is heated within the furnace to a temperature of about 475° C., and concurrently the zinc chloride is heated within the furnace to a temperature of about 375° C. This heating is continued for about 15 minutes. Then phosphor layer 12 is cooled to room temperature, washed by agitating faceplate 24 in distilled water for a few seconds and dried in air. The phosphor layer so prepared glows yellow or red-orange in response to ultraviolet excitation, the color depending on the relative amounts of cadmium and zinc therein.

Conductive layer 16 is applied by evaporating in conventional manner a layer of aluminum of uniform thickness onto the exposed surface of phosphor layer 12. As aforementioned the aluminum layer is sufficiently thick to be opaque and have an electrical resistance per unit area which is much lower than that of phosphor layer 12, but sufficiently thin that the resistance between terminal strips 18 and 20 is much greater than the internal resistance of source 40. Because the thickness of conductive layer 16 is uniform, the resistance per unit length of the layer is substantially the same over all portions of the layer. As a result the potential gradient developed along layer 16 is constant and the voltage scale of the assembly is linear.

Terminal strips 18, 20 and 22 are then applied to their respective conductive layers. These strips may be applied by a conventional method such as painting or silk-screening with a mixture composed of silver or gold flakes and an epoxy resin binder, and then heating to remove the solvent in the binder and cure the resin.

To protect assembly 10 from attack by moisture, and other atmospheric contaminants, a thin layer of glass (not shown) may be bonded by means of an electrically insulating epoxy resin to conductive layer 16, terminal strips 18, 20 and 22 and the surface portions of faceplate 24 adjoining the terminal strips.

Apparatus 10 has been described as having a rectangular form. However numerous other geometries may be employed. For example, apparatus 10 may be shaped circularly. In such an embodiment the required potential gradient across one of the conductive layers can be obtained readily by positioning a button-like area electrode corresponding e.g. to terminal strip 18 at the center of one of the conductive layers, and positioning a circular terminal strip corresponding to terminal strip 20 around the periphery of that conductive layer. In such an arrangement an annular region of the phosphor layer will emit light, and the position of the circular boundary between the light-emissive and quenched portions of the phosphor layer will move radially in response to variations in the potential applied to the other conductive layer.

Another embodiment is one in which apparatus 10 has a sector shape. Many other suitable geometries will be readily apparent to those skilled in the art.

The source 28 of ultraviolet radiation has been shown as a tubular bulb. However any other source of ultraviolet radiation or other exciting radiation may be used to excite phosphor layer 12. Moreover the source need not be positioned below apparatus 10 but may be positioned above it or to either side of it. Several sources may be used concurrently. Where conductive layer 16 is translucent to the exciting radiation, the source may be positioned behind apparatus 10.

Conductive layer 16 has been described as having a uniform thickness and hence a constant resistance per unit length. As aforementioned when such a layer is used, the assembly has a linear voltage-indicating scale. Alternatively a non-linear voltage-indicating scale may be provided by appropriately varying the resistance per unit length of layer 16 in a direction normal to terminal strips 18 and 20. Such variation can be gotten by varying the thickness of layer 16 along this direction. Such thickness variation can be achieved readily during the deposition of layer 16 by appropriately shaping and positioning the boat containing the metal to be evaporated onto faceplate 24.

The zinc cadmium sulfide phosphor specifically described above emits light lying between yellow and red orange in the spectrum, the precise color depending on the relative amounts of zinc and cadmium in the phosphor. Electroquenchable phosphor layers emitting colors in this spectral range can alternatively be obtained by preparing a zinc cadmium sulfide layer having a low cadmium sulfide content and then doping the layer with an appropriate amount of copper or silver. In addition other electroquenchable phosphors can be used in place of zinc cadmium sulfide in layer 12.

In addition it is feasible to produce a display in which only a line of light indicates the position of those opposing regions of conductive layers 14 and 16 which are at substantially the same electrical potential. Such a display is obtained by employing an apparatus in which both conductive layers 14 and 16 provide rectifying connections with phosphor layer 12. Such connections are obtained by fabricating both conductive layers of tin-indium oxide.

While I have described my invention by reference to a specific embodiment, I do not wish to be limited thereto, for obvious modifications will occur to those skilled in the art without departing from the scope of the invention.

What I claim is:

1. A voltage indicator comprising:
   a phosphor layer in which luminescence is excitable by irradiation of said layer with radiant energy of a given wavelength and is quenchable at any region of said layer, during said irradiation, by application of a reverse-biasing potential to a rectifying connection made to said region,
   first and second conductive layers respectively applied to opposing surfaces of said phosphor layer, at least portions of said two conductive layers being overlapped, one of said two conductive layers having a composition such that said one layer makes a rectifying connection to the area of said phosphor layer covered by said one layer, and one of said two conductive layers being transmissive of radiant energy emitted by said phosphor layer when irradiated with radiant energy of said given wavelength,
   means for establishing a potential gradient between first and second spaced portions of said first conductive layer, said gradient-establishing means comprising first means for making an electrical connection to said first portion, second means for making an electrical connection to said second portion, and means for applying a unidirectional voltage between said first means and said second means,
   means for applying radiant energy of said given wavelength to said phosphor layer to excite said phosphor layer into luminescence, and
   means for applying between said second conductive layer and one of said first and second means a unidirectional voltage to be measured,
   whereby, when the potential of said second conductive layer is established by said voltage to be measured at a value intermediate the respective potentials of said first means and said second means, a part of said rectifying connection is reverse-biased to quench the luminescence of the region of said phosphor layer covered by said reverse-biased part.

2. A voltage indicator comprising:
   a phosphor layer in which luminescence is excitable by irradiation of said layer with radiant energy of a given wavelength and is quenchable at any region of said layer, during said irradiation, by application of a reverse-biasing potential to a rectifying connection made to said region,
   first and second conductive layers respectively applied to opposing surfaces of said phosphor layer, at least portions of said two conductive layers being overlapped, one of said two conductive layers being composed of a tin-indium oxide, being transmissive of radiant energy emitted by said phosphor layer when irradiated with radiant energy of said given wavelength, and making a rectifying connection to the area of said phosphor layer covered by said one conductive layer,
   means for establishing a potential gradient between first and second spaced portions of said first conductive layer, said gradient-establishing means comprising first means for making an electrical connection to said first portion, second means for making an electrical connection to said second portion, and means for applying a unidirectional voltage between said first means and said second means,
   means for applying radiant energy of said given wavelength to said phosphor layer to excite said phosphor layer into luminescence, and means for applying between said second conductive layer and one of said first and second means a unidirectional voltage to be measured, whereby, when the potential of said second conductive layer is established by said voltage to be measured at a value intermediate the respective potentials of said first means and said second means, a part of said rectifying connection is reverse-biased to quench the luminescence of the region of said phosphor layer covered by said reverse-biased part.

3. A voltage indicator comprising:

a phosphor layer in which luminescence is excitable by irradiation of said layer with radiant energy of a given wavelength and is quenchable at any region of said layer, during said irradiation, by application of a reverse-bias potential to a rectifying connection made to said region, first and second conductive layers respectively applied to opposing surfaces of said phosphor layer, at least portions of said two conductive layers being overlapped, one of said two conductive layers having a composition such that said one layer makes a rectifying connection to the area of said phosphor layer covered by said one layer, and one of said two conductive layers being transmissive of radiant energy emitted by said phosphor layer when irradiated with radiant energy of said given wavelength, means for establishing a potential gradient between first and second spaced portions of said first conductive layer, said gradient-establishing means comprising first means for making an electrical connection to said first portion, second means for making an electrical connection to said second portion, and means for applying a unidirectional voltage between said first means and said second means, means for applying radiant energy of said given wavelength to said phosphor layer to excite said phosphor layer into luminescence, means for applying between said second conductive layer and one of said first and second means a unidirectional voltage to be measured, whereby, when the potential of said second conductive layer is established by said voltage to be measured at a value intermediate the respective potentials of said first means and said second means, a part of of said rectifying connection is reverse-biased to quench the luminescence of the given region of said phosphor layer covered by said reverse-biased part, and scale means of indicating the position of the boundary between said given region of said phosphor layer in which said luminescence is quenched and a contiguous luminescent region of said phosphor layer.

4. A voltage indicator comprising:

a phosphor layer in which luminescence is excitable by irradiation of said layer with radiant energy of a given wavelength and is quenchable at any region of said layer, during said irradiation, by application of a reverse-biasing potential to a rectifying connection made to said region, first and second conductive layers respectively applied to opposing surfaces of said phosphor layer, at least portions of said two conductive layers being overlapped, one of said two conductive layers being composed of a tin-indium oxide, being transmissive of radiant energy emitted by said phosphor layer when irradiated with radiant energy of said given wavelength, and making rectifying connection to the area of said phosphor layer covered by said one conductive layer, means for establishing a potential gradient between first and second spaced portions of said first conductive layer, said gradient-establishing means comprising first means for making an electrical connection to said first portion, second means for making an electrical connection to said second portion, and means for applying a constant unidirectional voltage between said first means and said second means, means for directing radiant energy of said given wavelength at said phosphor layer to excite said phosphor layer into luminescence, means for applying between said second conductive layer and one of said first and second means a unidirectional voltage to be measured, whereby, when the potential of said second conductive layer is established by said voltage to be measured at a value intermediate the respective potentials of said first means and said second means, a part of said rectifying connection is reverse-biased to quench the luminescence of the given region of said phosphor layer covered by said reverse-biased part, and scale means for indicating the position of the boundary between said given region of said phosphor layer in which said luminescence is quenched and a contiguous luminescent region of said phosphor layer.

5. A voltage indicator according to claim 4, wherein a specific one of said two conductive layers is transmissive of said radiant energy of said given wavelength, and said means for directing radiant energy comprises means irradiating said specific one conductive layer with radiant energy of said given wavelength.

6. A voltage indicator according to claim 4, wherein each of said two conductive layers makes a rectifying connection to the area of said phosphor layer covered thereby and each of said two conductive layers is composed of a tin-indium oxide.

7. A voltage indicator according to claim 4, wherein said one conductive layer composed of tin-indium oxide also is transmissive of radiant energy of said given wavelength, and wherein said means for directing radiant energy comprises means for irradiating said one layer composed of tin-indium oxide with radiant energy of said given wavelength.

8. A voltage indicator according to claim 4, wherein said phosphor layer is composed of a substance selected from the class consisting of zinc cadmium sulfide and cadmium sulfide.

9. A voltage indicator according to claim 4, wherein said phosphor layer is composed of a substance selected from the class consisting of zinc cadmium sulfide and cadmium sulfide, and said conductive layer other than said one layer composed of a tin-indium oxide is composed of aluminum.

10. A voltage indicator according to claim 9, wherein said phosphor layer is excitable to luminescence by ultraviolet radiation, said conductive layer composed of tin-indium oxide is transmissive of said ultraviolet radiation, and said means for directing radiant energy comprises means for irradiating with said ultraviolet radiation said one conductive layer composed of tin-indium oxide.

References Cited by the Examiner

UNITED STATES PATENTS

| 2,755,457 | 7/1956  | Diemer  | 324—96     |
| 2,780,731 | 2/1957  | Miller  | 313—108.1  |
| 2,818,531 | 12/1957 | Peek    | 313—108.1  |
| 2,851,634 | 9/1958  | Kazan   | 313—108.1  |
| 2,856,553 | 10/1958 | Henisch | 313—108    |
| 2,988,645 | 6/1961  | Wilmotte| 313—108.1  |

FREDERICK M. STRADER, *Primary Examiner.*

BENNETT G. MILLER, WALTER L. CARLSON,
*Examiners.*